(12) United States Patent
Vander Sluis et al.

(10) Patent No.: US 7,938,470 B2
(45) Date of Patent: May 10, 2011

(54) REMOVABLE STOWAGE DEVICE

(75) Inventors: Daniel Vander Sluis, Rochester Hills, MI (US); Robert C. Fitzpatrick, Holland, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 12/619,961

(22) Filed: Nov. 17, 2009

(65) Prior Publication Data

US 2010/0123328 A1 May 20, 2010

Related U.S. Application Data

(60) Provisional application No. 61/115,315, filed on Nov. 17, 2008.

(51) Int. Cl.
*B60J 7/00* (2006.01)

(52) U.S. Cl. ............ 296/24.34; 220/495.06; 220/495.08

(58) Field of Classification Search ................ 296/37.8, 296/24.34, 37.14; 220/495.06, 495.11, 495.08
See application file for complete search history.

(56) References Cited

U.S. PATENT DOCUMENTS

| 4,466,553 | A | * | 8/1984 | Zenger | ............. | 220/495.08 |
|---|---|---|---|---|---|---|
| 6,152,514 | A | | 11/2000 | McLellen | | |
| 6,435,587 | B1 | | 8/2002 | Flowerday et al. | | |
| 6,851,736 | B1 | | 2/2005 | Klopp et al. | | |
| 7,104,580 | B2 | | 9/2006 | Clark et al. | | |
| 7,370,898 | B2 | | 5/2008 | Stuart et al. | | |
| 2006/0226152 | A1 | | 10/2006 | Barber | | |
| 2007/0138819 | A1 | | 6/2007 | Akimoto et al. | | |
| 2007/0296234 | A1 | * | 12/2007 | Sturt et al. | ................ | 296/24.34 |

* cited by examiner

*Primary Examiner* — Joseph D Pape
(74) *Attorney, Agent, or Firm* — Matthew B. Dernier, Esq.; Gibson & Dernier LLP

(57) ABSTRACT

A removable stowage device having a flexible bag, a frame, and a first mounting element that can be inserted and attached to a receptacle and a second mounting element within a vehicle cockpit providing an easily accessible stowage area that functions to provide stowage space, and to secure and reduce the jostling or shifting of personal items, food and liquids, by a person or the motions of a moving vehicle.

18 Claims, 12 Drawing Sheets

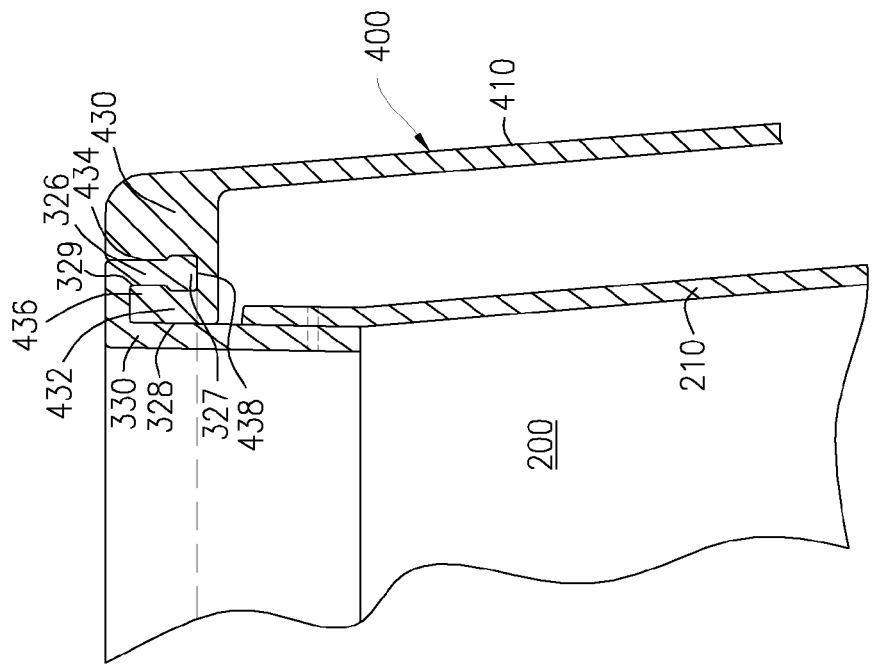
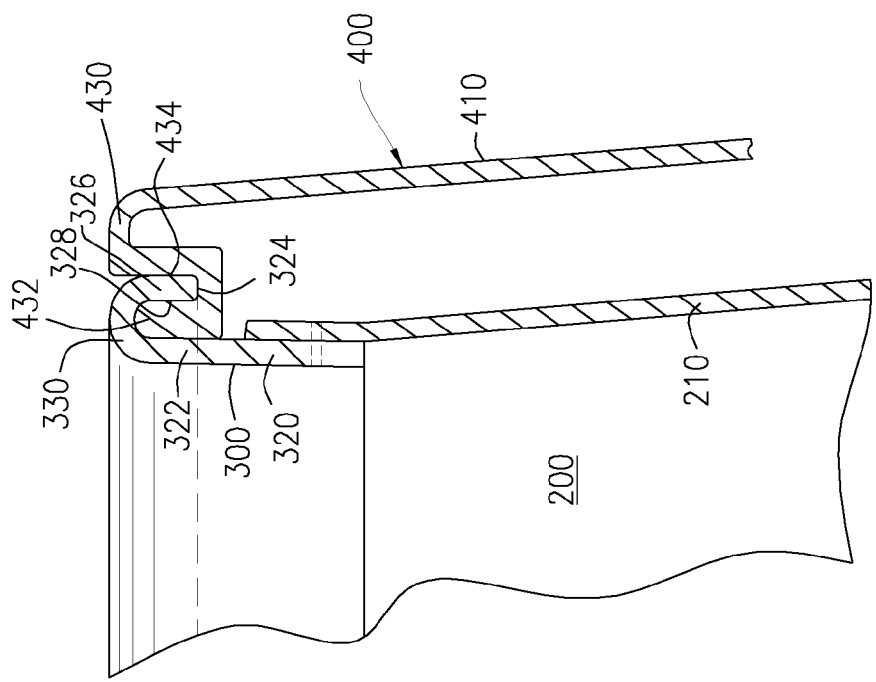

REMOVABLE STOWAGE DEVICE

CROSS-REFERENCE TO RELATED APPLICATIONS

This application claims the benefit of U.S. Provisional Patent Application No. 61/115,315, filed Nov. 17, 2008, the entirety of which is incorporated herein by reference.

TECHNICAL FIELD

The instant invention is related to a removable stowage device that functions to provide a stowage area, for example in the cockpit area of an automotive vehicle, that can be removed, replaced, and/or re-positioned to a different location in the cockpit area as desired by a user.

BACKGROUND

Vehicle cockpits employ a number of stowage compartments, most typically at least a glove box, a center console armrest/stowage box, and one or more cubby holes. In upscale vehicles, the cockpit may also employ additional stowage compartments built into the instrument panel and/or center console. To keep the cost of manufacture low for lower scale and/or entry-level vehicles, automakers typically provide cockpits that are sparse and lack many of the typical stowage compartments. Thus, a user of the lower scale and/or entry-level vehicle typically must endure a spartan console that lacks desirable amenities.

Additionally, users usually differ on the amount of stowage space they desire. For example, users that do not normally have many items to stow may prefer a more spacious passenger cabin such as additional passenger room. However, these same users may at some point desire additional temporary stowage space on those occasions when they have more than their typical amount of items to be stored. Alternatively, users may find that they always prefer additional stowage compartments over passenger room and would prefer a cockpit with more stowage space.

Furthermore, providing sufficient easily accessible stowage compartments are important for effective and comfortable user interaction within the vehicle. Awkward and uncomfortable movements of the user required to reach or grab items that are loose in the vehicle can result in inefficient operation, and can place a driver and passenger(s) into distracting, unsafe situations, which can result in accidents, injury, or the like.

Therefore, there is a need in the art for a vehicle console that is cost-effective for the manufacturer and provides adaptable ergonomic characteristics and preferences, such as easily accessible stowage space, to a user.

SUMMARY OF THE INVENTION

Generally described, a user of embodiments of the instant invention is provided with a removable stowage compartment that is easily accessible and allows the user to adapt the stowage space according to the user's needs. Additionally, the embodiments of the instant invention are cost effective because they may be formed from soft flexible materials that are lighter in weight than typical manufactured molded hard plastic or metal forms thus reducing the overall weight of the vehicle. Furthermore, the soft flexible materials also serve to dampen noise from emanating into the passenger cabin.

One or more embodiments of the present invention employ a removable stowage device that provides a flexible bag that may be positioned in receptacles disposed within a vehicle cockpit, such as the center console. Normally, a driver places his or her personal items, such as electronic devices, wallet, purse or business bag, on the empty passenger seat or in other existing stowage areas. This is usually done because it is convenient and the driver can gain quick access to an item in the purse or business bag. Often the purse, business bag or smaller personal item will have shifted out of the driver's reach due to shifting and movement off of the passenger seat or stowage area and may result in the driver having to bend and stretch in an unsafe manner in order to retrieve the purse or business bag. The removable stowage device may be situated in a location, such as the center console, that provides for safe stowage and does not obstruct the driver, but at the same time, is easily accessed with little or no unsafe movement required by the driver.

In accordance with one or more embodiments of the present invention, a removable stowage device may include a flexible bag, a frame, a receptacle, and a plurality of mounting elements. The flexible bag may include a plurality of side panels and a bottom panel that are connected in such a way as to form the flexible bag having an opening. The flexible bag may further include a semi-rigid frame to maintain a predetermined shape of the flexible bag opening. The semi-rigid frame may include a side wall as well as a first mounting element extending around the flexible bag opening. The flexible bag and frame may be shaped and sized to couple to, and be received within and connected by the mounting elements to the receptacle that is disposed within an object, for example, the center console of a vehicle.

It is contemplated that the receptacle may include a plurality of side panels and a bottom panel forming an inner volume and a receptacle opening, and a second mounting element extending around the receptacle opening that are oriented in such a way as to receive the flexible bag and to fasten and hold it in a tight and snug orientation via a connection between the first and second mounting elements to prevent the inadvertent disengagement by the movement from a moving vehicle.

The first and second mounting elements may each include corresponding interlocking ridges and channels that are sized and shaped to create a tight and snug orientation when the first and second mounting elements are interlocked together. It is contemplated that a portion of the side wall of the frame forms part of the first mounting element interlocking channel and/or interlocking ridge.

In accordance with one or more embodiments of the present invention the flexible bag side panels and bottom panel may be made of soft flexible material selected from any suitable flexible material that can be connected together to form the flexible bag. In one embodiment, the panels may be connected together in a way such that edge and bottom flaps are formed exterior to the flexible bag that are used to help fasten the flexible bag to the receptacle.

In accordance with one or more embodiments of the present invention the removable stowage device may include additional fastening mechanisms disposed within the receptacle, and a plurality of spaced apart fastening apertures disposed on the side panels, edge and/or bottom flaps that are sized and shaped to receive the fastening mechanisms. The fastening mechanisms may function alone or in combination with the first and second mounting elements to maintain the shape of the flexible bag and further secure it to the receptacle. In one embodiment the fastening mechanism may include a shaft and a stop member that when inserted through the fastening apertures engages and holds the fastening apertures and the flexible bag in a tight and taut orientation and prevents inadvertent disengagement by vehicle movements. In another embodiment the fastening mechanism may be a clip having two ends, each end adapted to fit through the fastening aperture and a clip aperture disposed on a clip receptacle that is fused to an interior wall of the receptacle.

In accordance with one or more embodiments of the present invention the flexible bag may include one or more adjustable interior panels that function to create small stowage compartments inside the flexible bag and are adaptable to the user's needs. It is contemplated that the adjustable interior panels may be varied in size and shape so that they can be connected together and/or to the side and bottom panels of the flexible bag, for example by hook and loop fasteners, to form pockets or small compartments such as but not limited to cup-holders, map pockets, pen-holder, notebook pocket, personal electronic device holders, lockable compartments, covered compartments and the like.

In accordance with one or more embodiments of the present invention the flexible bag may include an electrical connection, a signal connection and a docking station for electronic devices. Through the use of conductors and terminals, the power and/or signal connection may be located in the flexible bag, the receptacle or on the console portion near the removable stowage device. For example, a portable music device may be connected to a vehicle sound system and charged by docking the portable music device in the flexible bag that is a docking station having both a power and signal connection. Other electronic devices that may be connected in this manner include, but are not limited to cellular telephones, GPS navigation devices, notebook computers, portable data storage devices, electronic books and digital cameras.

In accordance with one or more embodiments of the present invention the removable stowage device may include a plurality of interchangeable flexible bags, each interchangeable flexible bag adapted for a different need. As the needs of the user changes from trip to trip, so to can the plurality of flexible bags. For example, the user may desire a food and drink stowage area on a vacation road trip, an office filing system during business trips or an entertainment system during another trip. The user need simply remove the existing flexible bag by disengaging the fastening mechanisms and replace it with a different more suitable flexible bag.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustration, there are forms shown in the drawings that are presently preferred, it being understood, however, that the invention is not limited to the precise arrangements and instrumentalities shown.

FIG. 5A is a side view of an interlocking apparatus between the frame of the flexible bag and receptacle in accordance with at least one aspect of the present invention.

FIG. 5B is a side view of an interlocking apparatus between the frame of the flexible bag and receptacle in accordance with at least one further aspect of the present invention.

DETAILED DESCRIPTION OF THE PRESENT INVENTION

In this document, for the purposes of explanation, specific numbers, materials and configurations are set forth in order to provide a thorough understanding of the invention. It will be apparent, however, to one having ordinary skill in the art, that the invention may be practiced without these specific details. In some instances, well known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearance of the phrase "in an embodiment" in various places in the specification are not necessarily all referring to the same embodiment.

For the purposes of describing various aspects of the present invention, reference may be made to using a removable stowage device in a center console of a vehicle. It will be appreciated by those skilled in the art, however, that the various embodiments of the removable stowage device described and claimed herein may have application to many other areas, including the center section of the rear passenger seats, various consoles located in other vehicles including trucks, vans, semi-truck, buses, boats, motor vehicle, or the like.

In particular, the removable stowage device of the present invention is directed to providing a user with a flexible bag on the vehicle console that is easily accessible and adaptable according to his or her preference.

Figure 1:
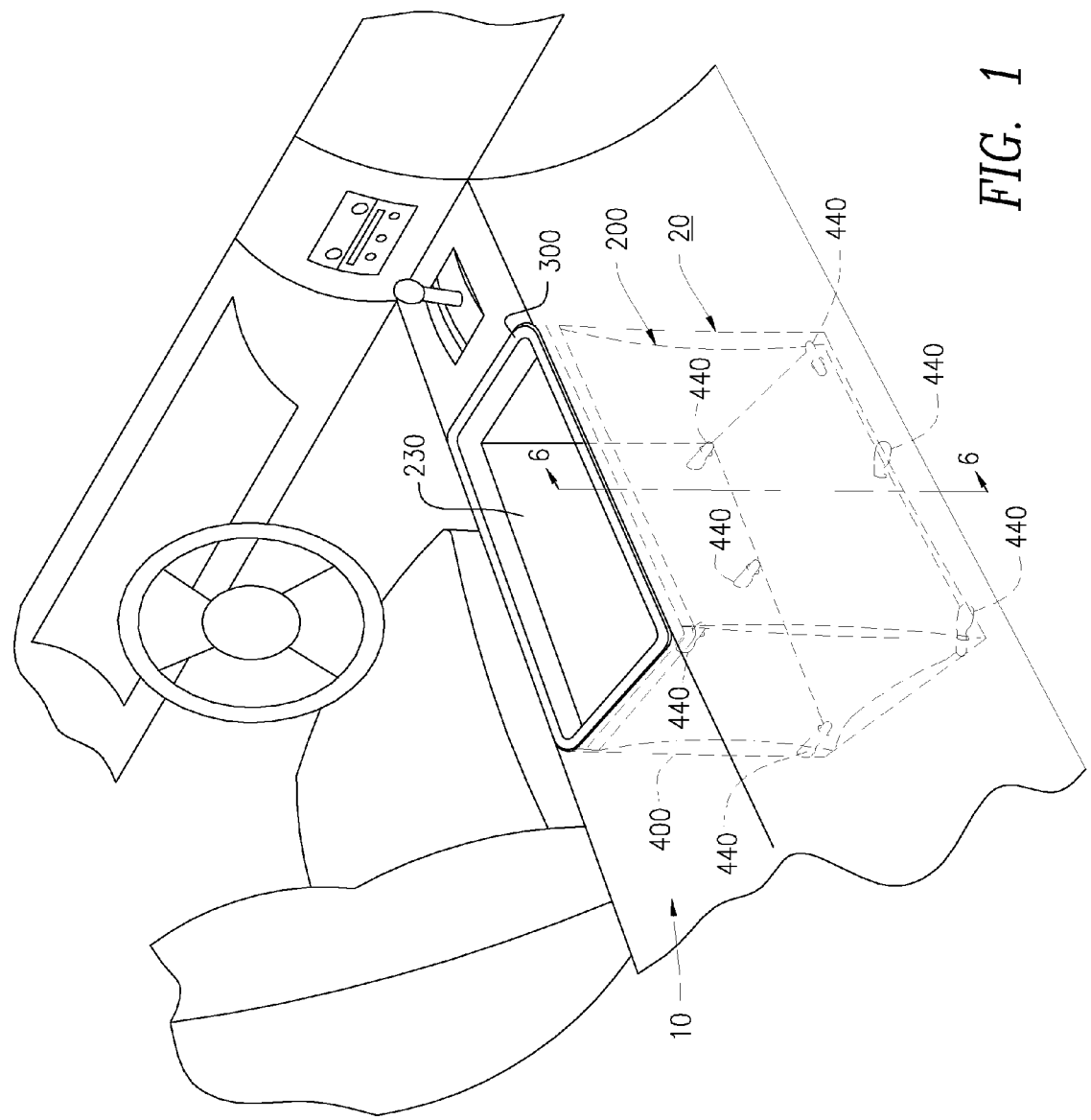
FIG. 1 is a perspective view of a removable stowage device including a flexible bag, a frame and a receptacle disposed within a vehicle console in accordance with at least one aspect of the present invention.

In one embodiment, the removable stowage device may be situated in a location that provides for safe stowage that does not obstruct the driver, but at the same time, is easily accessed with little or no physical movement required by the driver. FIG. 1 is an interior view of an automotive vehicle showing a center console 10 employing one embodiment of a removable stowage device 20. For example, the removable stowage device 20 may be positioned and attached to a receptacle disposed within the center console 10.

Figure 2:
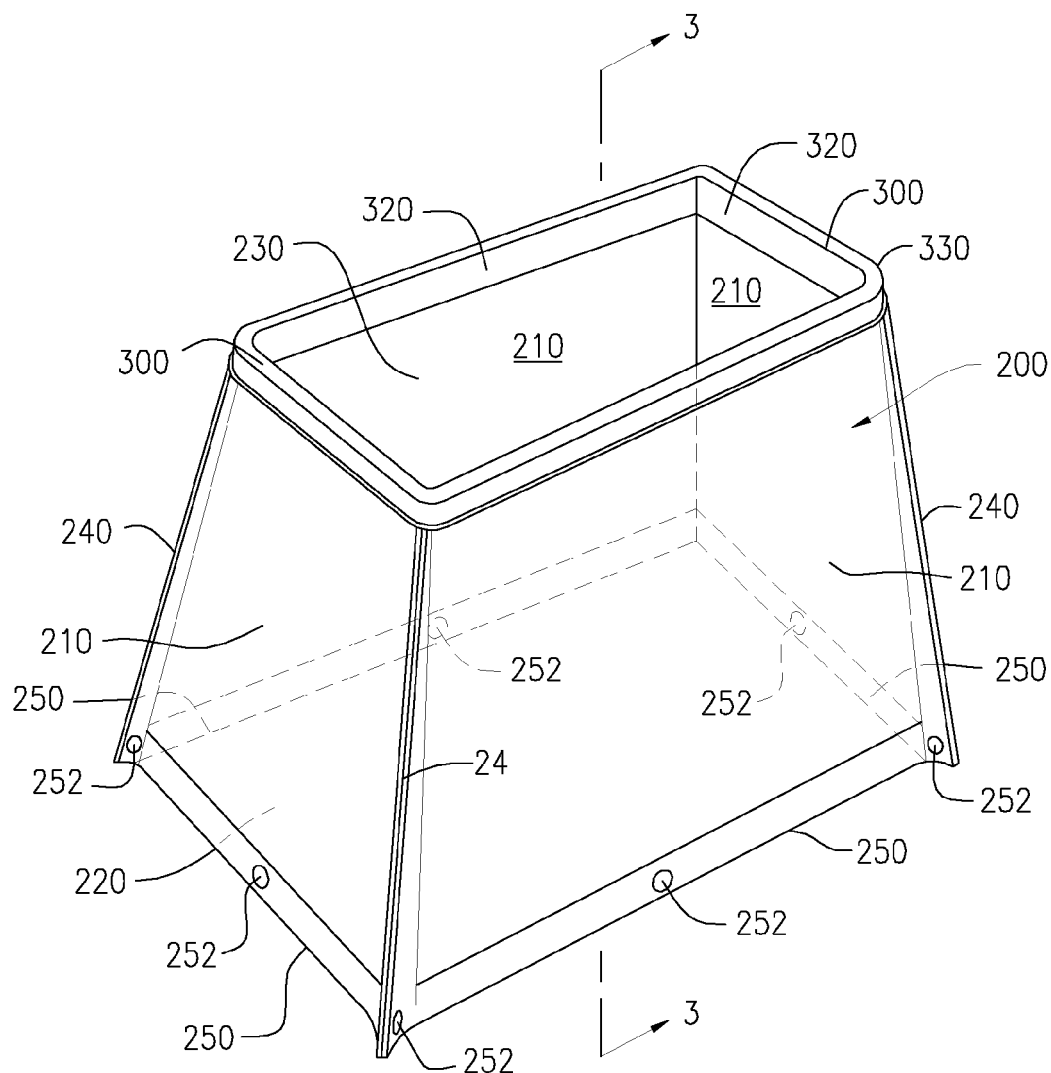
FIG. 2 is a perspective view of a flexible bag and frame in accordance with at least one aspect of the present invention.

As depicted in FIG. 1 the removable stowage device 20 includes a flexible bag 200, a frame 300, and a receptacle 400. As shown in FIG. 2, the flexible bag 200 may include a plurality of side panels 210 and a bottom panel 220. The panels may be connected in such a way as to form the flexible bag 200 having an opening 230. For example, in one embodiment four side panels 210 and a bottom panel 220 may be employed such that the four side panels 210 and bottom panel 220 are joined along their edges to form the flexible bag 200 having the opening 230. The flexible bag 200 may be shaped and sized to couple to, and be received within the receptacle 400 that is disposed on an object, for example, the center console 10. In one embodiment, the side panels 210 and bottom panel 220 may be made of soft flexible material selected from any suitable flexible material such as fabric of vinyl, cotton canvas, laminated cotton, leather, carbon fiber, nylon, or other synthetic fiber, all of which may be coated, waterproofed, impregnated with fire-retardant material or the like. The side panels 210 and bottom panel 220 may be connected by various means known to a skilled artisan such as stitching, sewing, stapling, gluing, by hook and loop fasteners, or heating/melting. For example, the panels may be stitched together along the perimeters at a suitable distance away from the edges of the panels such that the edges are exterior to the resulting flexible bag 200. The edges form an edge flap 240 where two side panels 210 are joined and a bottom flap 250 where a side panel 210 and bottom panel 220 are joined.

Figure 4:
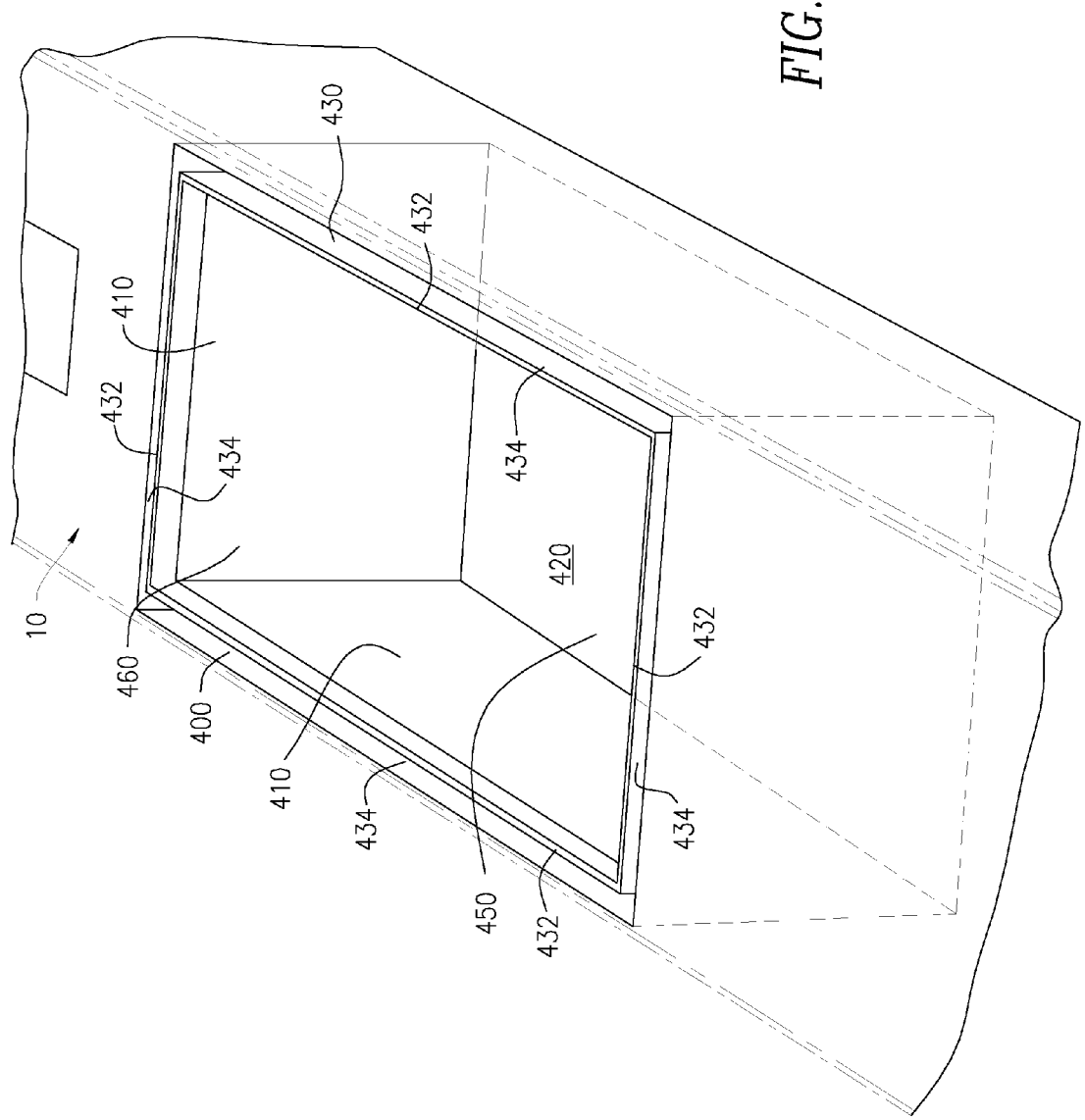
FIG. 4 is a perspective view of a receptacle disposed within a vehicle console and suitable for receiving the flexible bag and frame of FIG. 2 in accordance with at least one aspect of the present invention.

As depicted in FIG. 4 the receptacle 400 may be disposed on an object, for example, the center console 10. The receptacle 400 may include a plurality of inner side panels 410, an inner bottom panel 420. The panels may be connected in such a way as to form an inner volume 450 and a receptacle opening 460, both capable to receive the flexible bag 200 (see FIG. 2). The receptacle 400 may further include a second mounting element 430 that extends around the perimeter of the receptacle opening 460 and functions to receive the flexible bag 200 and to fasten and hold it in a tight and snug orientation to prevent inadvertent disengagement by movement from a moving vehicle. For example, the second mounting element 430 may be a lower portion of an interlocking apparatus such that the second mounting element 430 may include one or both of a lower interlocking ridge 432 and a lower interlocking channel 434, both extending along the perimeter of the receptacle opening 460.

Now referring back to FIGS. 2-3, the frame 300 may include a side wall 320 that may be attached and/or integrated with the flexible bag 200 along the perimeter of the opening 230 and functions to provide and maintain a predetermined shape and form to the flexible bag 200. The frame 300 may further include a first mounting element 330 that extends around the perimeter of the opening 230 and functions to securely fasten the flexible bag 200 to the receptacle 400 (see FIG. 1).

The frame 300 may be semi-rigid such that the side wall 320 may be made of any semi-rigid structured material selected from any suitable material such as metal, plastic, wood, rubber, silicone, latex or any material that maintains its shape, can be slightly bent or deformed, and is resistant to breaking or snapping. The side wall 320 may be attached to the flexible bag 200 by various means known to a skilled artisan such as stitching, sewing, stapling, gluing, by hook and loop fasteners, or heating/melting. As shown, the side wall 320 may be stitched to the interior of the flexible bag 200 along the opening 230 and functions as a semi-rigid rim that is in direct contact with the object, for example, the center console 10, and keeps the open predetermined shape and form of the flexible bag 200. It is contemplated that a portion of the side wall 320 may be positioned relative to the flexible bag 200 so that a portion of the side wall 320, referred to as an exposed side wall 322 having a side wall terminal end 324, is exposed and extends above and out of the interior of the flexible bag 200.

Figure 3:
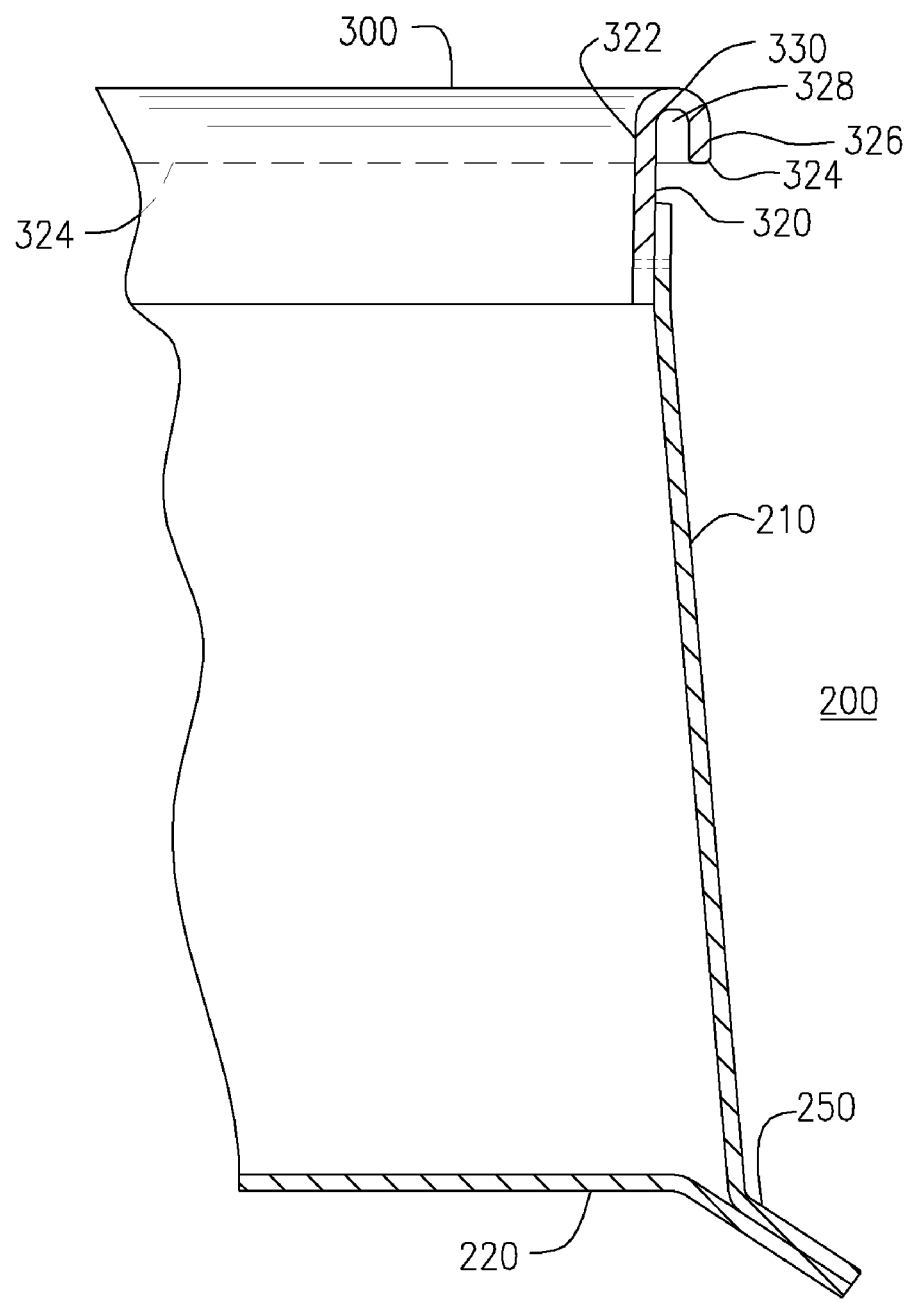
FIG. 3 is a cross-sectional view of the flexible bag and frame taken through line 3-3 of FIG. 2 in accordance with at least one aspect of the present invention.

As shown in FIGS. 2-3, the first mounting element 330 may be disposed along the entire portion of the exterior side wall 322. A cross-sectional view of the flexible bag 200 and frame 300 taken through line 3-3 of FIG. 2 is depicted. A portion of the exposed side wall 322 may function as part of the first mounting element 330. For example, the first mounting element 330 may be an upper portion of an interlocking apparatus such that the side wall terminal end 324 may be folded over so that an upper interlocking ridge 326 and an upper interlocking channel 328 are formed.

Now referring to FIG. 5A, the lower interlocking ridge 432 and lower interlocking channel 434 of the second mounting element 430 may be sized and shaped to snugly engage the upper interlocking ridge 326 and upper interlocking channel 328 of the first mounting element 330. To fasten the frame 300, and hence the flexible bag 200, to the second mounting element 430 of the receptacle 400, a user would insert the flexible bag 200 into the receptacle 400, position the upper interlocking channel 328 over the lower interlocking ridge 432 and the upper interlocking ridge 326 over the lower interlocking channel 434, and apply a sufficient downward motion to force the lower interlocking ridge 432 into the upper interlocking channel 328 and at the same time to force the upper interlocking ridge 326 into the lower interlocking channel 434 thereby creating a tight and snug orientation. In one embodiment the combination of the interlocking first mounting element 330 and the second mounting element 430 form a smooth and flush surface. To remove the flexible bag 200 from the receptacle 400, a user simply pulls the flexible bag 200 up and away thus releasing the tight and snug orientation. It is contemplated that the frame 300 or the flexible bag 200 may further include pull tabs (not shown) that may be positioned along the frame 300 and function to provide a convenient spot on which a user may pull the flexible bag 200 up and away.

Another embodiment of the interlocking apparatus employing the first and second mounting elements, 330 and 430, is depicted in FIG. 5B. In this embodiment the terminal ends of the upper interlocking ridge 326 and/or lower interlocking ridge 432 may be enlarged such that an enlarged upper head 327 and an enlarged lower head 436 are formed. The lower interlocking channel 434 is sized such that the bottom of the lower interlocking channel 434 is enlarged forming a lower enlarged cavity 438 such that the upper head 327 may be snugly received. The upper interlocking channel 328 is sized such that the bottom of the upper interlocking channel 328 is enlarged forming an upper enlarged cavity 329 such that the upper head 327 may be snugly received. To fasten the frame 300, and hence the flexible bag 200, to the second mounting element 430 of the receptacle 400, a user would insert the flexible bag 200 into the receptacle 400, position the upper interlocking channel 328 over the lower interlocking ridge 432 and the upper interlocking ridge 326 over the lower interlocking channel 434, and apply a sufficient downward motion to force the upper interlocking ridge 326 into the lower interlocking channel 434 and at the same time to force the upper head 327 into the lower enlarged cavity 438. The same force causes the lower interlocking ridge 432 and lower head 436 to be forced into the upper interlocking channel 328 and upper enlarged cavity 329. To remove the flexible bag 200 from the receptacle 400, a user simply pulls the flexible bag 200 up and away thus releasing the tight and snug orientation.

Now referring to FIGS. 1 and 6A-6C, another embodiment of the removable stowage device 20 may include receptacle fastening mechanisms 440 disposed on one or more of the inner side panels 410 and/or inner bottom panel 420 of the receptacle 400, and a plurality of spaced apart fastening apertures 252 that are sized and shaped to receive the receptacle fastening mechanisms 440. The receptacle fastening mechanisms 440 function to maintain a taut orientation of the flexible bag 200 and further secure it to the receptacle 400. In one embodiment, the receptacle fastening mechanism 440 may include a shaft 442 that is sized and shaped to extend through the corresponding fastening apertures 252; and a stop member 444 disposed at or near the terminal end of the shaft 442, that functions to resist the fastening mechanism 440 from disengaging the fastening aperture 252. It is contemplated that the shaft 442 is fused to and extends at an angle from the inner side panel 410. The angle of the shaft 442 relative to the inner panel 410 is optimized to provide a taut and shape-retaining orientation of the flexible bag 200 when the fastening aperture 252 is attached to the receptacle fastening mechanism 440.

In one embodiment at least two of the bottom flaps 250 include the plurality of spaced apart fastening apertures 252 that are sized and shaped to receive the receptacle fastening mechanisms 440. It is contemplated that the two bottom flaps 250 having the fastening apertures 252 may be directly opposite to one another. For example, as shown in FIG. 2, one fastening aperture 252 may be centrally located and a second and third fastening aperture 252 at each end of the bottom flap 250 for a total of three fastening apertures 252. The fastening apertures 252 may include a reinforced rim 254 that functions to provide a more secure engagement of the receptacle fastening mechanism 440 and to resist any wear and tear over time. The reinforced rim 254 may be made of any suitable material including but not limited to soft, semi-rigid or rigid materials such as cotton, canvas, nylon threading, nylon, silicone, rubber, latex, plastic or metal.

Figure 6A:
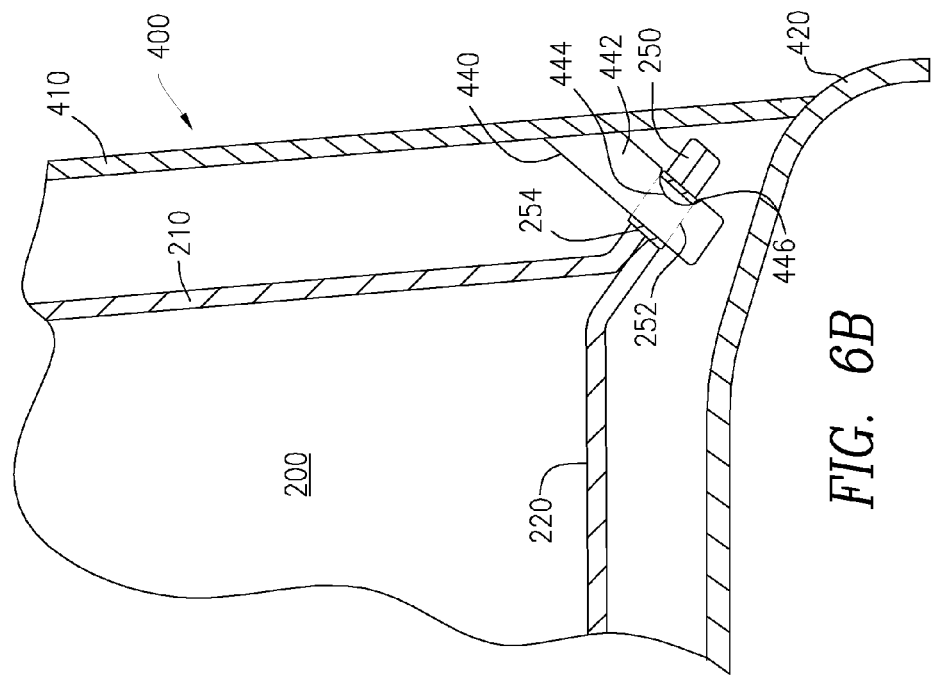
FIG. 6A is a cross-sectional view of the receptacle, frame, flexible bag and fastening mechanism taken through line 6-6 of FIG. 1 in accordance with at least one aspect of the present invention.
Figure 6B:
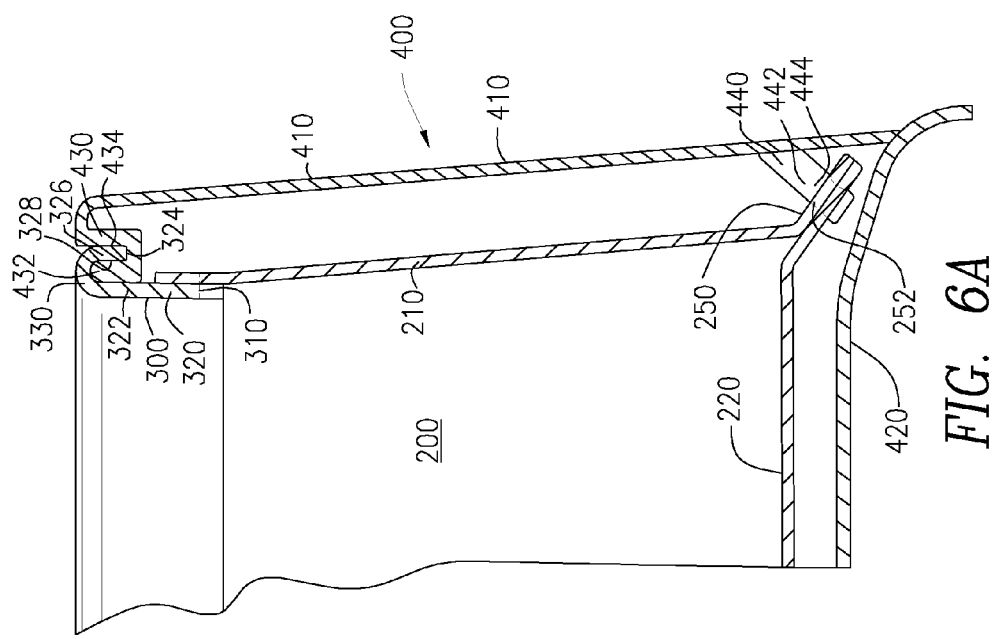
FIG. 6B is a cross-sectional close-up view of the receptacle, flexible bag and fastening mechanism of FIG. 6A in accordance with at least one aspect of the present invention.

The stop member 444 may take various forms. In one example the shaft 442 may include a cut-away portion 446 located near the terminal end of the shaft 442 as shown in FIGS. 6A and 6B. In this example, the cut-away portion 446 may take the shape of a semicircular cut-out sized to receive and hold the reinforced rim 254 until manually disengaged. For example, the semicircular cut-out may be approximately about a quarter to about half of the diameter of the shaft 442. To create a taut and shape-retaining orientation of the flexible bag 200 the cut-away portion 446 is oriented to be facing away from the bottom flap 250 and at a sufficient distance away such that a slight stretching of the soft flexible material of the flexible bag 200 is required for the shaft 442 to engage or disengage the fastening aperture 252. As the fastening aperture 252 is pulled over the shaft 442, the reinforced rim 254 settles in the cut-away portion 446 in the resting configuration. To disengage the shaft 442 and stop member 444 from the fastening aperture 252 the user simply applies force in the opposite direction so that the reinforced rim 254 is disengaged from the cut-away portion 446 and the fastening aperture 252 is released from the shaft 442. However, it is contemplated that the stop member 444 may include other shapes and forms known to the skilled artisan.

Figure 6C:
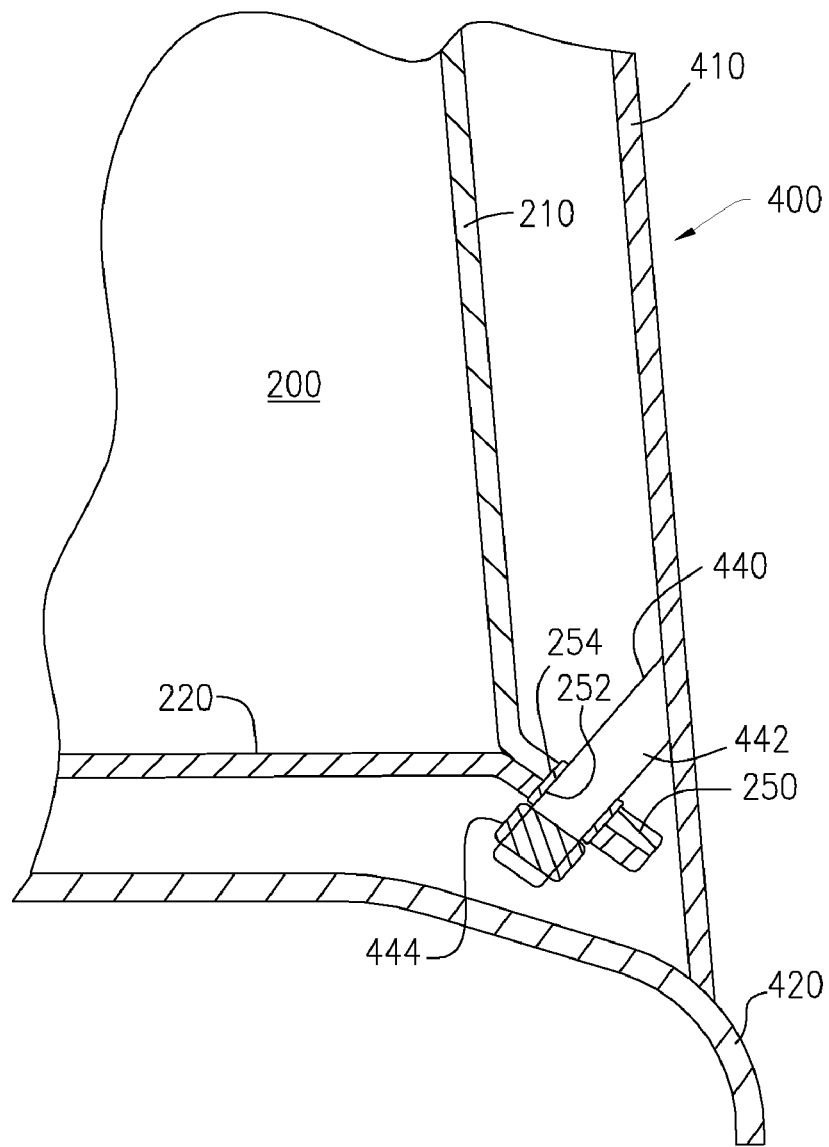
FIG. 6C is a cross-sectional close-up view of the receptacle, flexible bag and fastening mechanism of FIG. 6A in accordance with at least one further aspect of the present invention.

In another example, as shown in FIG. 6C, the stop member 444 may be deformable and is located at the terminal end of the shaft 444. In this example, as a user connects the flexible bag 200 to the receptacle 400 by the receptacle fastening mechanism 440, the stop member is deformed as it is forced through the fastening aperture 252 and attains a resting configuration once through the fastening aperture 252. To disengage the shaft 442 and stop member 444 from the fastening aperture 252 the user simply applies force in the opposite direction so that the deformable stop member 444 is deformed and forced back through the fastening aperture 252.

Figure 6D:
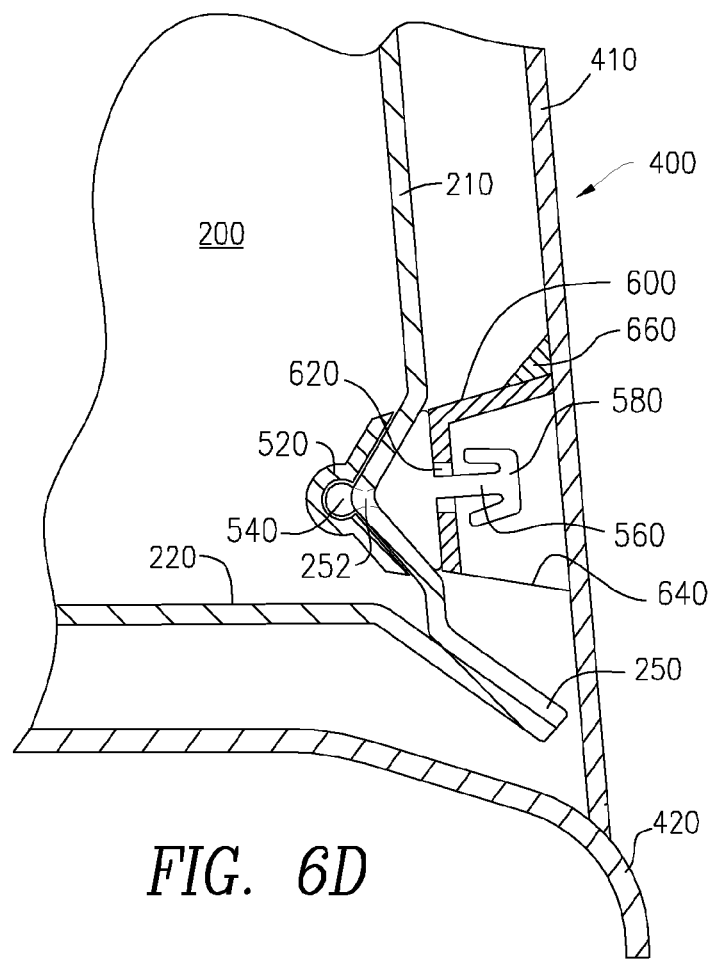
FIG. 6D is a cross-sectional close-up view of the receptacle, flexible bag and fastening mechanism in accordance with at least one further aspect of the present invention.
Figure 6E:
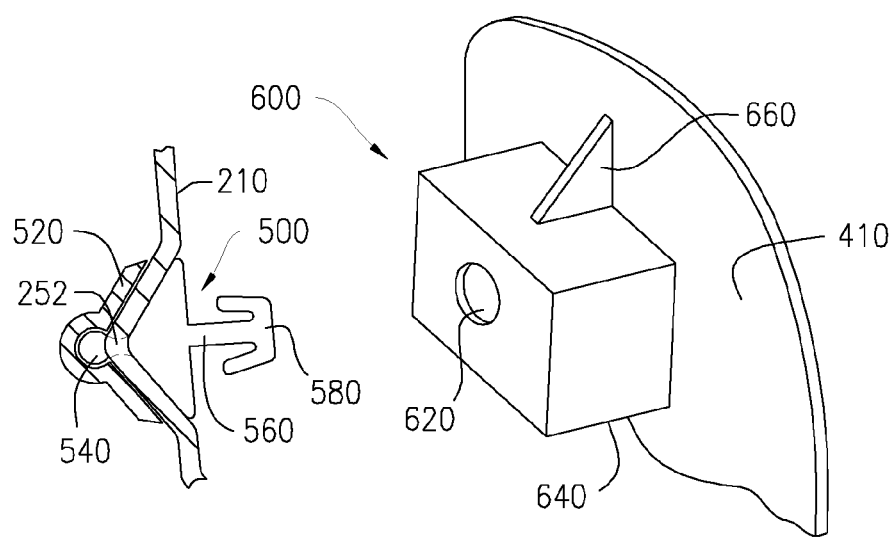
FIG. 6E is a perspective view of the fastening mechanism of FIG. 6D in accordance with at least one further aspect of the present invention.

In another embodiment, as shown in FIGS. 6D-6E, at least one of the side panels 210 include one or more spaced apart fastening apertures 252 that are sized and shaped to receive the receptacle fastening mechanisms 440. In this embodiment, the fastening apertures 252 are located near the bottom edge of the side panel 210. The fastening apertures 252 are adapted to receive a clip 500 which can be clipped into a corresponding clip receptacle 600 fused to and extending from the inner side panel 410. The clip 500 may be any suitable clip such as but not limited to a ball and socket type clip as is known to one skilled in the art. For example, the ball and socket type clip such as TRW Automotive Inc. Reference Part No. 3890863100, may be used. In one example, the socket 520 is sized to receive a ball 540, and is attached to the side panel 210 at the fastening aperture 252. The ball 540 is integrated to one end of a shaft 560 having a deformable fastener 580 on the opposing end, the fastener 580 sized to engage an aperture 620 on the corresponding clip receptacle 600. The clip receptacle 600 may be in the shape of an open box that includes five sides with an open bottom 640 that functions to provide access to the connected deformable fastener 580. To attach the flexible bag 200 to the receptacle 400, a user inserts the ball 540 through the fastening aperture 252 and into the socket 520, and the deformable fastener 580 into aperture 620 thereby creating a removable connection. To remove the connection, a user need only detach the ball 540 from the socket 520 and/or access the deformable fastener 580 via the open bottom 640 and push the deformable fastener 580 back through the aperture 620. The clip receptacle 600 may also include one or more reinforcement walls 660 that function to further reinforce the connection between the clip receptacle 600 and the inner side panel 410. In another example, the ball and socket clip may be reversed such that the socket 520 is attached to the receptacle 600 at the aperture 620.

Figure 7:
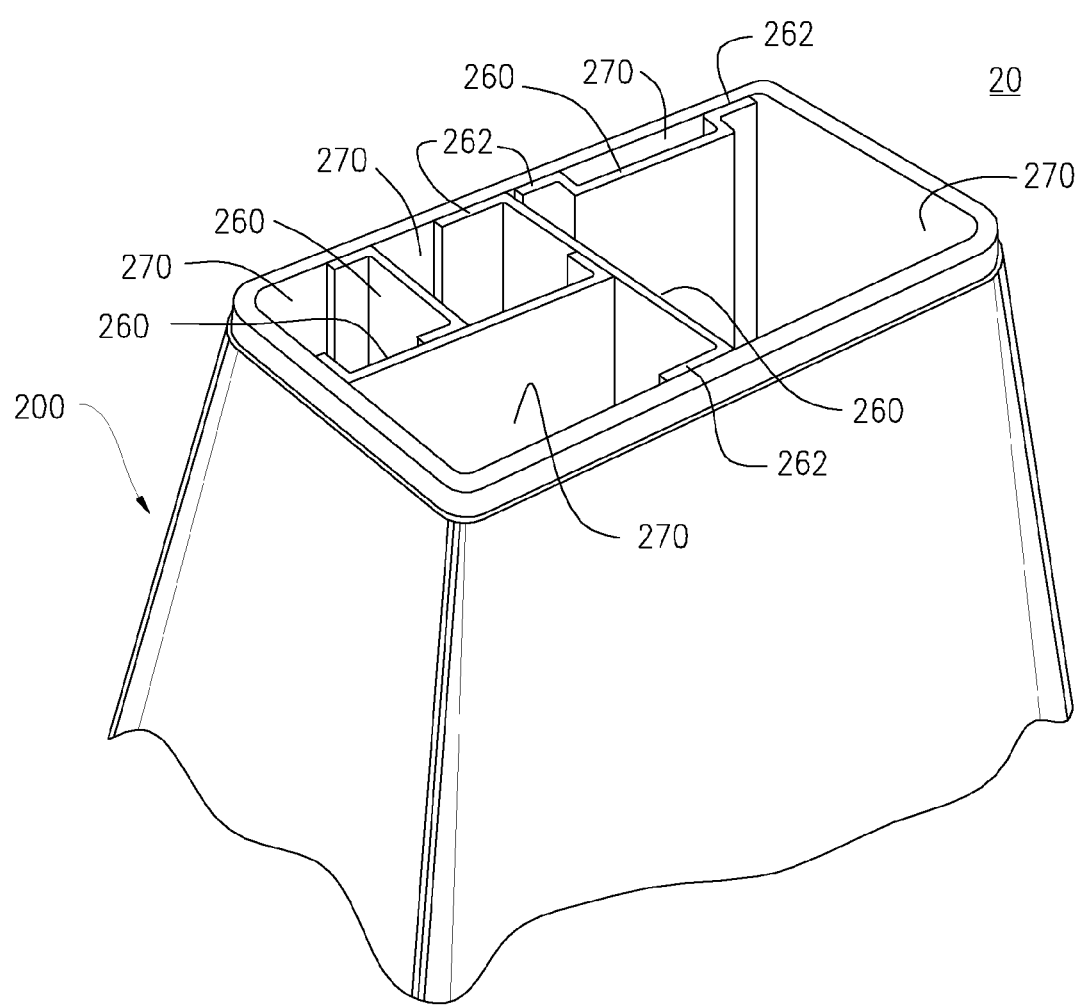
FIG. 7 is a perspective view of a flexible bag and frame having a plurality of adjustable interior panels in accordance with at least one aspect of the present invention.

Now referring to FIG. 7 the flexible bag 200 may include one or more adjustable interior panels 260 that function to create small stowage compartments 270 inside the flexible bag 200 and are adaptable to the user's needs. It is contemplated that the adjustable interior panels 260 may be varied in size and shape so that they can be connected together to form pockets or small compartments 270 such as but not limited to cup-holders, map pockets, pen-holder, notebook pocket, personal electronic device holders, lockable compartments, covered compartments and the like. In one embodiment the adjustable interior panels 260 include flaps 262 on one or more of their edges, the flaps 262 having hook and loop fasteners that may be used to connect to other adjustable interior panels 260 and/or the side panels 210 and bottom panel 220 of the flexible bag 200. In this manner the user may rearrange the adjustable interior panels 260 according to his or her needs.

In another embodiment the flexible bag 200 may include an electrical connection, a signal connection and a docking station for electronic devices. It is contemplated that the flexible bag 200 may include plug receptacles that are connected to various electronic systems of the vehicle. For example, a portable music device may be connected to a vehicle sound system and charged by docking the portable music device in the flexible bag 200 docking station having both a power and signal connection. Other electronic devices that may be connected in this manner include, but are not limited to cellular telephones, GPS navigation devices, notebook computers, portable data storage devices, electronic books and digital cameras.

Figure 8A:
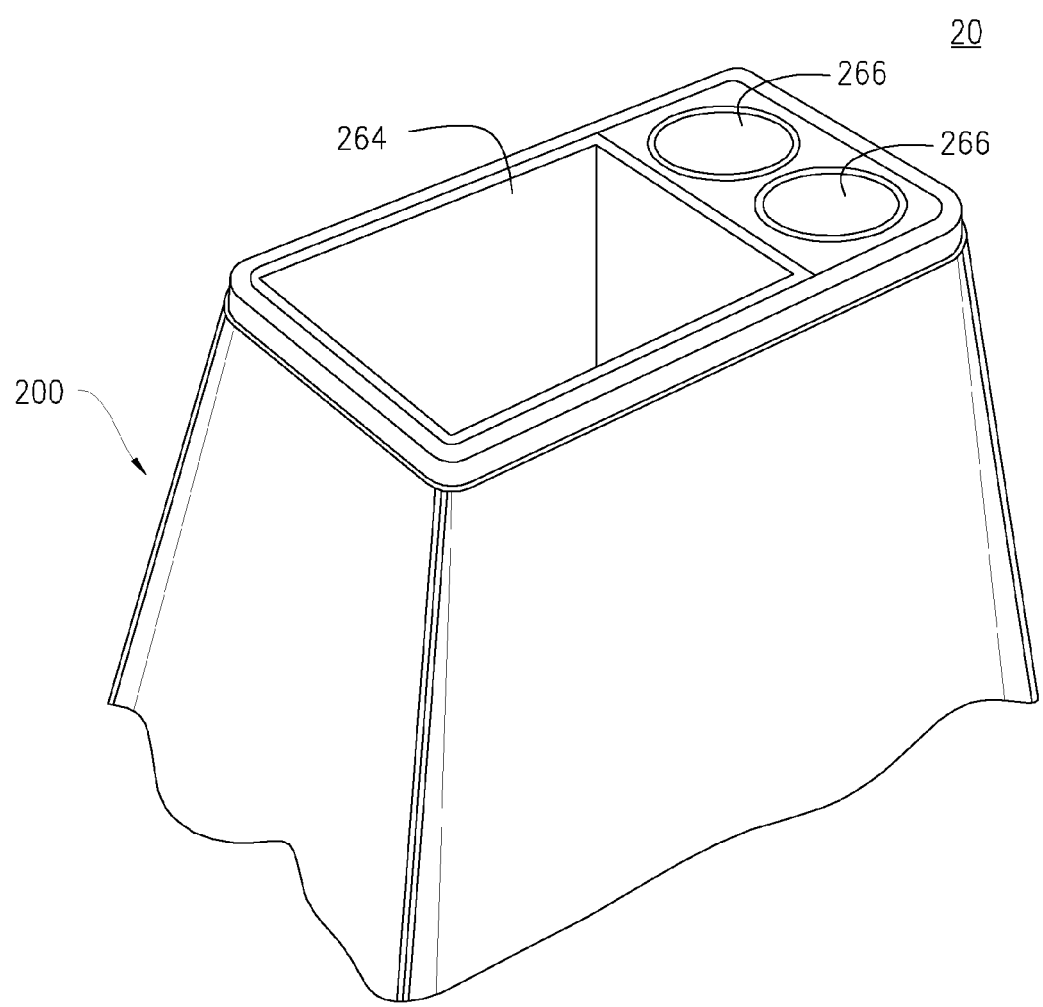
FIG. 8A is a perspective view of a flexible bag and frame having an insulated layer and cup-holders in accordance with at least one aspect of the present invention.
Figure 8B:
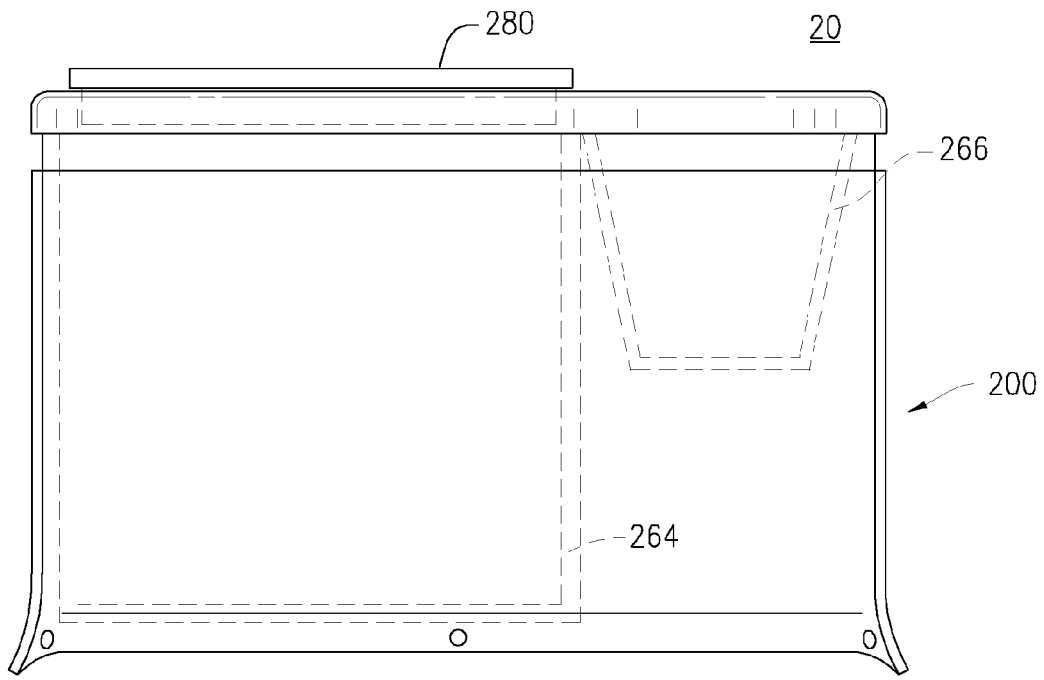
FIG. 8B is a side view of the flexible bag of FIG. 8A in accordance with at least one aspect of the present invention.
Figure 9B:
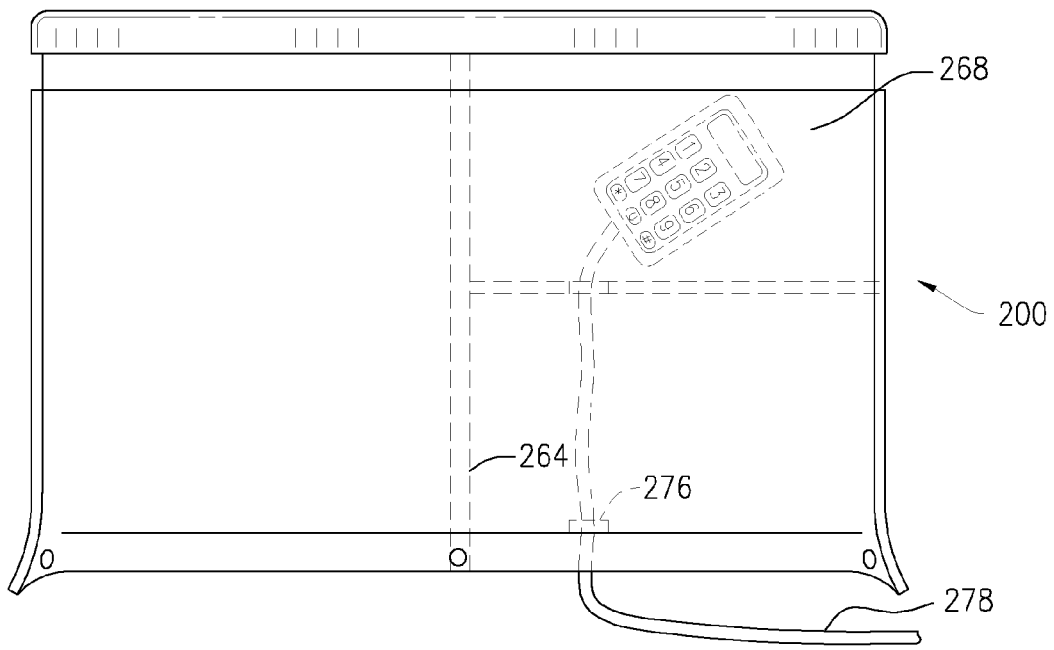
FIG. 9B is a side view of the flexible bag of FIG. 9A in accordance with at least one aspect of the present invention.
Figure 9A:
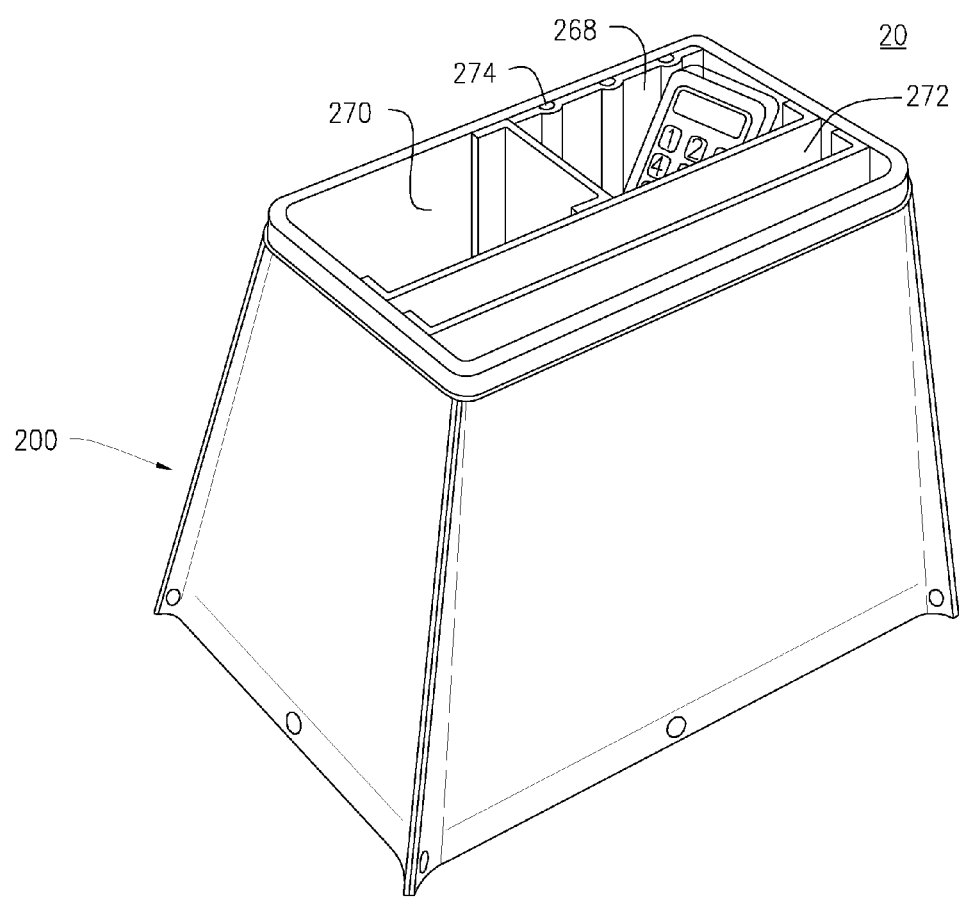
FIG. 9A is a perspective view of a flexible bag and frame having pen, notebook and electronic device compartments in accordance with at least one aspect of the present invention.

In another embodiment, the removable stowage device 20 includes a plurality of interchangeable flexible bags 200, each interchangeable flexible bag 200 adapted for different user's needs. As the needs of the user changes from trip to trip, so to can the plurality of flexible bags 200. The user need simply remove the existing flexible bag 200 by disengaging the fastening mechanisms 440 and the interlocking first mounting element 330 and second mounting element 430 and replace it with a different more suitable flexible bag 200. For example, as shown in FIGS. 8A-8B, one flexible bag 200 may be insulated with an insulating layer 264 and contain one or more cup-holders 266 that function to store and insulate hot or cold food and drink. The flexible bag 200 may optionally include an insulated top cover 280 over the insulating layer 264 that may or may not be hinged. Another flexible bag 200, depicted in FIGS. 9A-9B, may be divided into small compartments to hold electronic devices 268, notebooks and papers 272, pens 274 and other stationary items and functions as a mobile office. Another flexible bag 200 may include a small video screen and speakers and functions as an entertainment center.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A removable stowage device for a vehicle, comprising:
a flexible bag having a first opening;
a frame coupled to the first opening of the bag, defining a predetermined shape of the first opening, and including a first mounting element comprising a first interlocking ridge and a first interlocking channel; and
a receptacle located within the interior of the vehicle and including a second opening defining a substantially similar predetermined shape as the frame, communicating with an inner volume of the receptacle, and being at least partially circumscribed by a second mounting element comprising a second interlocking ridge and a second interlocking channel, wherein:
the second opening and inner volume of the receptacle are sized and shaped to receive the bag therein, and
the first and second mounting elements have complementary configurations whereby the first interlocking ridge is sized and shaped to engage the second interlocking channel disposed within the second mounting element and the first interlocking channel is sized and shaped to receive the second interlocking ridge protruding from the second mounting element, such that when the frame engages the receptacle, the bag is maintained within the inner volume of the receptacle.

2. The removable stowage device according to claim 1, wherein the flexible bag further comprises a plurality of side panels and a bottom panel, which when connected together forms the flexible bag.

3. The removable stowage device according to claim 1, wherein the first interlocking ridge includes an enlarged head and the second interlocking channel includes an enlarged cavity sized and shaped to snugly receive and hold the enlarged head such that the enlarged head and or second interlocking channel is deformed as the enlarged head is forced into the enlarged cavity.

4. The removable stowage device according to claim 1, wherein the second interlocking ridge includes an enlarged head and the first interlocking channel includes an enlarged cavity sized and shaped to snugly receive and hold the enlarged head such that the enlarged head and or first interlocking channel is deformed as the enlarged head is forced into the enlarged cavity.

5. The removable stowage device according to claim 2, wherein the flexible bag further comprises at least four edge flaps extending along the edges where two side panels meet and overlap, and at least two bottom flaps extending along the edges where a side panel and bottom panel meet and overlap.

6. The removable stowage device according to claim 5, further comprising one or more fastening mechanisms disposed within the receptacle operating to prevent the flexible bag from disengaging from the receptacle.

7. The removable stowage device according to claim 6, wherein the flexible bag further comprises a plurality of fastening apertures that are disposed on one or a combination of the side panels, edge flaps and bottom flaps, and wherein the fastening apertures are sized and shaped to receive the fastening mechanism such that the fastening mechanism prevents the flexible bag from disengaging the receptacle.

8. The removable stowage device according to claim 7, wherein the fastening apertures are disposed on two of the bottom flaps that are opposite to each other.

9. The removable stowage device according to claim 8, wherein the fastening mechanism comprises:
a shaft that is sized and shaped to extend through the fastening apertures; and
a stop member disposed at or near the terminal end of the shaft, and resisting the fastening mechanism from disengaging the receptacle,
wherein the shaft is disposed at an angle on an interior surface of the receptacle such that the flexible bag and fastening apertures are temporarily stretched and/or deformed to receive the fastening mechanism.

10. The removable stowage device according to claim 9, wherein the stop member is disposed at the terminal end of the shaft and is deformable as it is forced through the fastening apertures and attains a resting configuration once through the fastening apertures that resists disengagement of the fastening mechanism from the receptacle.

11. The removable stowage device according to claim 10, further including a semi-rigid or rigid rim disposed around the perimeter of the fastening apertures.

12. The removable stowage device according to claim 9, wherein the stop member is a cut-away portion of the shaft near the terminal end facing away from the flexible bag such that as the fastening apertures are forced on the shaft, they become lodged in the cut-away portion of the shaft and attains a resting configuration that resists disengagement of the fastening mechanism from the receptacle.

13. The removable stowage device according to claim 7, wherein the fastening apertures are disposed on at least one of the side panels.

14. The removable stowage device according to claim 13, wherein the fastening mechanism comprises:
- a clip having first and second ends wherein the first end is sized and shaped to extend through the fastening aperture and the second end is sized and shaped to extend through a clip aperture disposed on a clip receptacle disposed on an interior surface of the receptacle.

15. The removable stowage device according to claim 2, the flexible bag further comprising one or more moveable interior panels that are oriented in a manner to divide the flexible bag into smaller divided and separate interior compartments.

16. The removable stowage device according to claim 15, wherein the plurality of side panels, bottom panel and interior panels are covered with a layer of hook and loop fasteners and operate to allow multiple configurations of the interior compartments.

17. The removable stowage device according to claim 1, the flexible bag further comprising one or more power or signal connection for supplying power or electrical signals to the flexible bag.

18. The removable stowage device according to claim 1, wherein the receptacle is disposed within the center console of an automotive vehicle.

* * * * *